(12) United States Patent
Schwarzmann

(10) Patent No.: US 8,259,114 B2
(45) Date of Patent: Sep. 4, 2012

(54) SYSTEM AND METHOD FOR VISUALIZING PARAMETER EFFECTIVE DATA SETS

(75) Inventor: Winfried Schwarzmann, Waghaeusel (DE)

(73) Assignee: SAP Aktiengesellschaft, Walldorf (DE)

( * ) Notice: Subject to any disclaimer, the term of this patent is extended or adjusted under 35 U.S.C. 154(b) by 419 days.

(21) Appl. No.: 12/570,184

(22) Filed: Sep. 30, 2009

(65) Prior Publication Data

US 2011/0074787 A1    Mar. 31, 2011

(51) Int. Cl.
*G06T 11/20* (2006.01)

(52) U.S. Cl. .......... 345/440; 345/440.1; 345/440.2; 345/441; 345/442

(58) Field of Classification Search .......... 345/440–442; 715/210; 709/202, 224
See application file for complete search history.

(56) References Cited

U.S. PATENT DOCUMENTS

| | | | |
|---|---|---|---|
| 6,321,241 B1 * | 11/2001 | Gartung et al. | 715/210 |
| 6,581,068 B1 * | 6/2003 | Bensoussan et al. | 1/1 |
| 6,750,864 B1 * | 6/2004 | Anwar | 345/440 |
| 7,639,256 B1 * | 12/2009 | Yablonski et al. | 345/440 |
| 8,082,268 B2 * | 12/2011 | Vasudevan | 707/770 |
| 2004/0030741 A1 * | 2/2004 | Wolton et al. | 709/202 |
| 2008/0104225 A1 * | 5/2008 | Zhang et al. | 709/224 |

OTHER PUBLICATIONS

M. Wattenberg, Visual exploration of multivariate graphs. In Proceedings of the SIGCHI conference on Human Factors in computing systems, pp. 811-819. ACM Press, Apr. 2006.*
N. Conklin, S. Prabhakar and C. North, "Multiple Foci Drill-Down through Tuple and Attribute Aggregation Polyarchies in Tabular Data," Proc. IEEE Symp. Information Visualization, Oct. 2002.*
Chris Stolte, Diane Tang, Pat Hanrahan, Multiscale Visualization Using Data Cubes, IEEE Transactions on Visualization and Computer Graphics, v.9 n.2, p. 176-187, Apr. 2003.*

* cited by examiner

*Primary Examiner* — Jin-Cheng Wang
(74) *Attorney, Agent, or Firm* — Blakely, Sokoloff, Taylor & Zafman LLP

(57) ABSTRACT

A system and method for visualizing a plural dimensional data. One of a plurality of potential visualization formats is selected in a processor for each dimension of a plural dimensional data set. The selected visualization format is used to display the associated dimension on an electronic display. User interface elements are provided to navigate between elements of the plural dimensional data set within the displayed visualization format.

15 Claims, 5 Drawing Sheets

Mode: Dimension Graph
Mode: Pivot Twin Tree
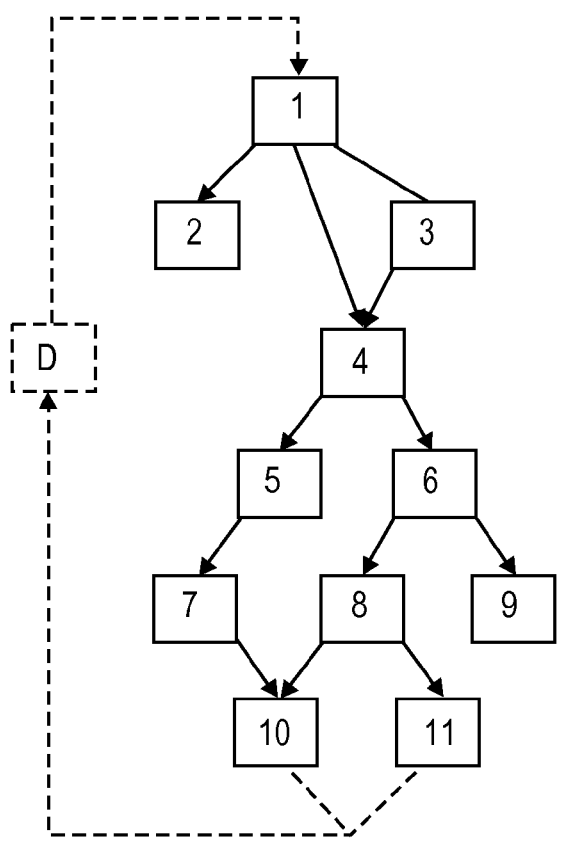
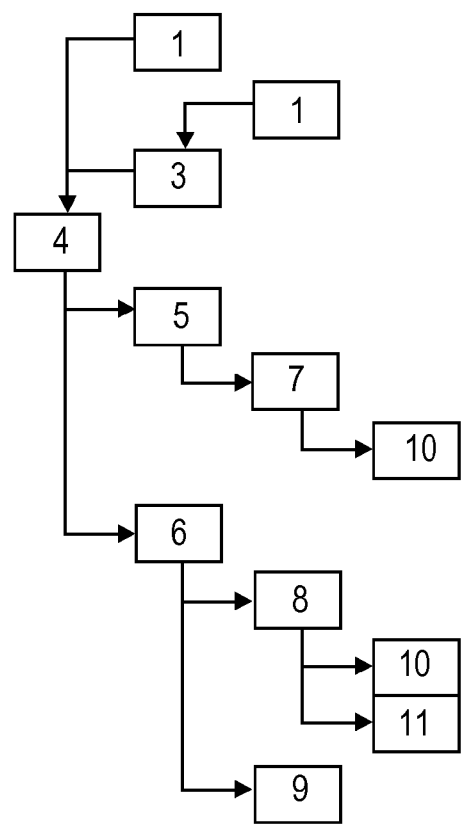
FIG. 2A
FIG. 2B

SYSTEM AND METHOD FOR VISUALIZING PARAMETER EFFECTIVE DATA SETS

BACKGROUND OF THE INVENTION

1. Field

Embodiments of the invention relate to visualization tools. More specifically, embodiments of the invention relate to tools for visualizing plural dimensional data sets.

2. Background

Parameter effectivity is defined by the existence of one or multiple validity parameters that define the valid states of an underlying data object. For example, data objects representing a product structure by super and subordinate bills of materials (BOM's). In the context of the parameter effectivity an arbitrarily large number of validity dimensions may be introduced. This makes display in a three-dimensional space impossible. Moreover, many validity dimensions may not be fully ordered. Accordingly, they do not display on a linear axis. Finally, the validity of two or more object states may overlap. Consequently, for a particular value of the parameter multiple object states are relevant. Existing tools are inadequate to provide effective visualization of parameter effective data sets in a user friendly way.

SUMMARY

A system and method for visualizing a plural dimensional data set is disclosed. One of a plurality of potential visualization formats is selected in a processor for each dimension of a plural dimensional data set. The selected visualization format is used to display the associated dimension on an electronic display. User interface elements are provided to navigate between elements of the plural dimensional data set within the displayed visualization format.

BRIEF DESCRIPTION OF DRAWINGS

The accompanying drawings, which constitute a part of this disclosure, illustrate various embodiments and aspects of the present invention and, together with the description, explain the principles of the invention.

FIGS. 2A thru 2C show three possible visualization formats for use in connection with one embodiment of the invention.

DETAILED DESCRIPTION

Figure 1:
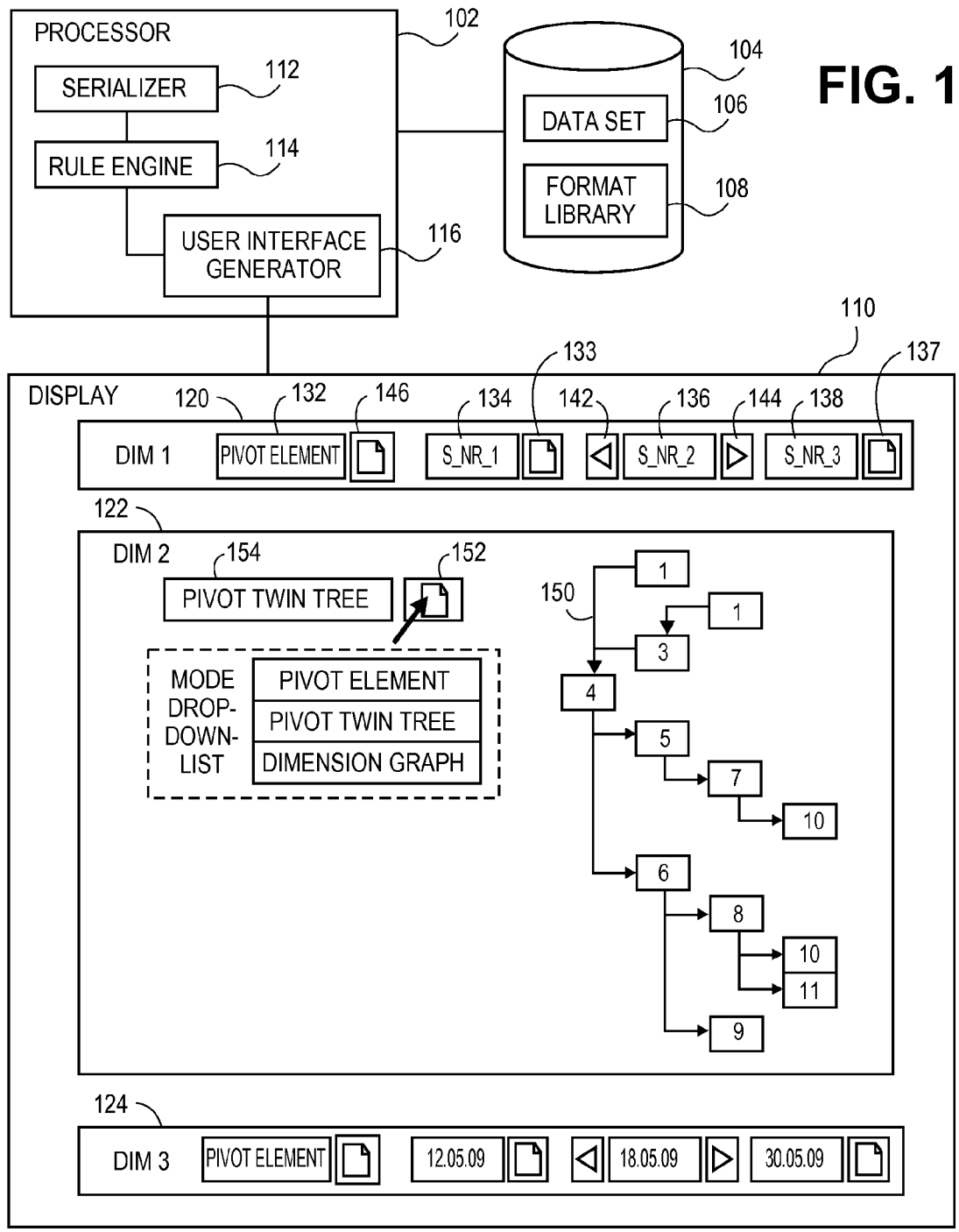
FIG. 1 is a block diagram of a system according to one embodiment of the invention.

FIG. 1 is a block diagram of a system according to one embodiment of the invention. A processor 102 is coupled to a persistent storage unit 104, which may contain a plural dimensional data set 106 and a format library 108. In one embodiment, persistent storage 104 may be one or more databases with which processor 102 may communicate. Persistence storage 104 need not be local to the processor. In some embodiments, persistent storage 104 is remotely accessed over a distributed network. Moreover, it is alluded to above persistence storage unit 104 may be represented by more than one physical unit, such that data set 106 and format library 108 are in distinct physical storage units.

Processor 102 includes a user interface (UI) generator 116 to generate a graphical user interface (GUI) on a display 110 coupled to the processor. Data set 106 has plural dimensions and in some embodiments of the invention it is possible to combine some of those dimensions for purposes of display. Processor 102 may include a serializer 112 to serialize, e.g., arrange in order those elements of the data set for which ordering is ambiguous. For example, many changes of an engineered product structure may be deemed to become effective all at the same time, such as the start of production (SOP). All of those change states can be ordered prior to visualization by serializer 112. In some embodiments, serializer 112 may prompt a user for an ordering, in other embodiments serializer 112 may impose a default ordering but permit user modification. Additionally, a rule engine 114 may be provided to both guide the serialization and/or possible combination of dimensions prior to display. For example, rule engine 114 may include a rule that defines a rule order or user defined ordering preference. In one embodiment, rule engine 114 remembers user preferences and defines rules to enforce those preferences on future visualizations.

One manner in which validity dimensions may be combined is by creating a tuple of some of the parameter values for each state. The tuples are then indexed along an aggregate dimension axis. However, this combination may lead to further ambiguities in ordering. Serializer 112 permits an order to be imposed where otherwise ambiguities would exist.

The display 110 under the control of processor 102 displays a graphically user interface (GUI) that permits visualization of plural dimensional data set 106. Processor 102 includes user interface generator 116 to generate the user interface displayed in display 110. User interface generator 116 generates a window 120, 122, 124 for each dimension of data set 106. In this example, data set 106 is deemed to have three dimensions: a structural dimension (dimension 2) displayed in window 122 and two validity dimensions (serial number and time dimension 1 and dimension 3) displayed in windows 120 and 124 respectively. Format library 108 defines a plurality of possible visualization formats. In one embodiment, format library 108 defines a dimensional graph format, a pivot element format, and a pivot twin tree format each with or without artificial elements introduced between leaf nodes and root nodes. These formats are explained more fully below in connection with FIGS. 2A thru 2C. Each dimension window 120, 122, 124 contains a format selection field, e.g., selection field 132 in window 120 and selection field 154 in window 122. Associated with this selection field is a soft button 146, 152 respectively, which in one embodiment, when actuated, causes a display of a drop-down list of the available formats for user selection. Windows 120 and 124 show a pivot element display while dimension window 122 shows a pivot twin tree 150. In the pivot element format as shown in window 120, a current pivot element is shown in pivot element field 136. Also, part of the pivot element format is a predecessor field 134 and a successor field 138. Pivot element field 136 is associated with a forward arrow soft button 144 and reverse arrow soft button 142, the actuation of either button shifts the pivot element to the shown successor or predecessor dimensional element respectively. Associated with each of the predecessor and successor fields is a soft button 133 and 137 respectively, which permits a user to select from a drop-down list of the possible predecessors or successors. For example, referring to the pivot tree 150 if displayed in a pivot element format with element 4 as the pivot element, the drop-down list for the predecessor field would show element 1 and element 3 while the drop-down list for the successor field would show element 5 and element 6.

As the pivot elements in the validity dimensions are changed, the states reflected in the structural dimension in window 122 e.g. within pivot twin tree 150 are changed to be consistent with the validity constraints applied. In this manner, an arbitrary number of dimensions may be displayed each within its window, but propagating changes in one dimension to the states effected in another.

Figure 2C:
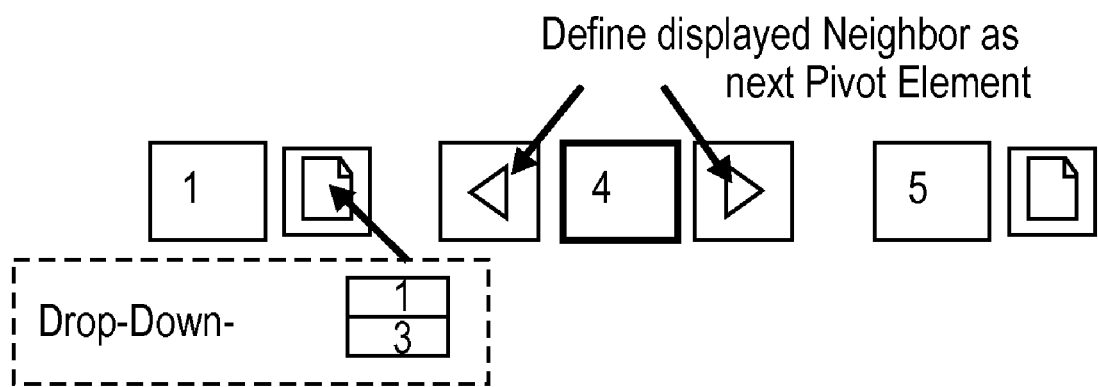

FIGS. 2A thru 2C show three possible visualization formats for use in connection with one embodiment of the invention. FIG. 2A shows a dimension graph with an artificial element D introduced between leaves 10, 11 and root 1. Introduction of such an artificial element permits navigation from leaves to roots in a continuous manner rather than requiring traversal back up the tree. Such an artificial element may be introduced into any of the formats shown. FIG. 2B is a pivot twin tree with element 4 selected as the pivot element. In this format, element 2 is absent because it bares no relation to the reflected pivot element. It would also be possible to, for example, limit the visualization to a range around the pivot element, for example, only immediate successors or predecessors in such case only elements 1, 3, 4, 5 and 6 would be shown and elements 7, 10, 8, 10, 11, 9 and the second occurrence of 1 as the predecessor of 3 would be excluded. The pivot twin tree format is preferable for displaying most of a graph in a list viewer (each field in a separate line). FIG. 2C shows the pivot element visualization previously described with reference to FIG. 1 where 4 is the pivot element, and 1 and 5 show up as predecessor and successor of 4, respectively. However, with the drop-down list permits either 1 or 3 to be selected as the predecessor in focus of 4. This allows the user to define an ordering of the elements at least implicitly. Actuation of the forward or reverse arrow soft button changes the pivot element from 4 to, in this example 1 or 5, but the dropdown list associated with the successor (here 5) would show both 5 and 6 as options. Thus, a user may, for example, select 6 as the immediate successor to 4 right before actuating the forward arrow soft button in order to make 6 the new pivot element.

Figure 3:
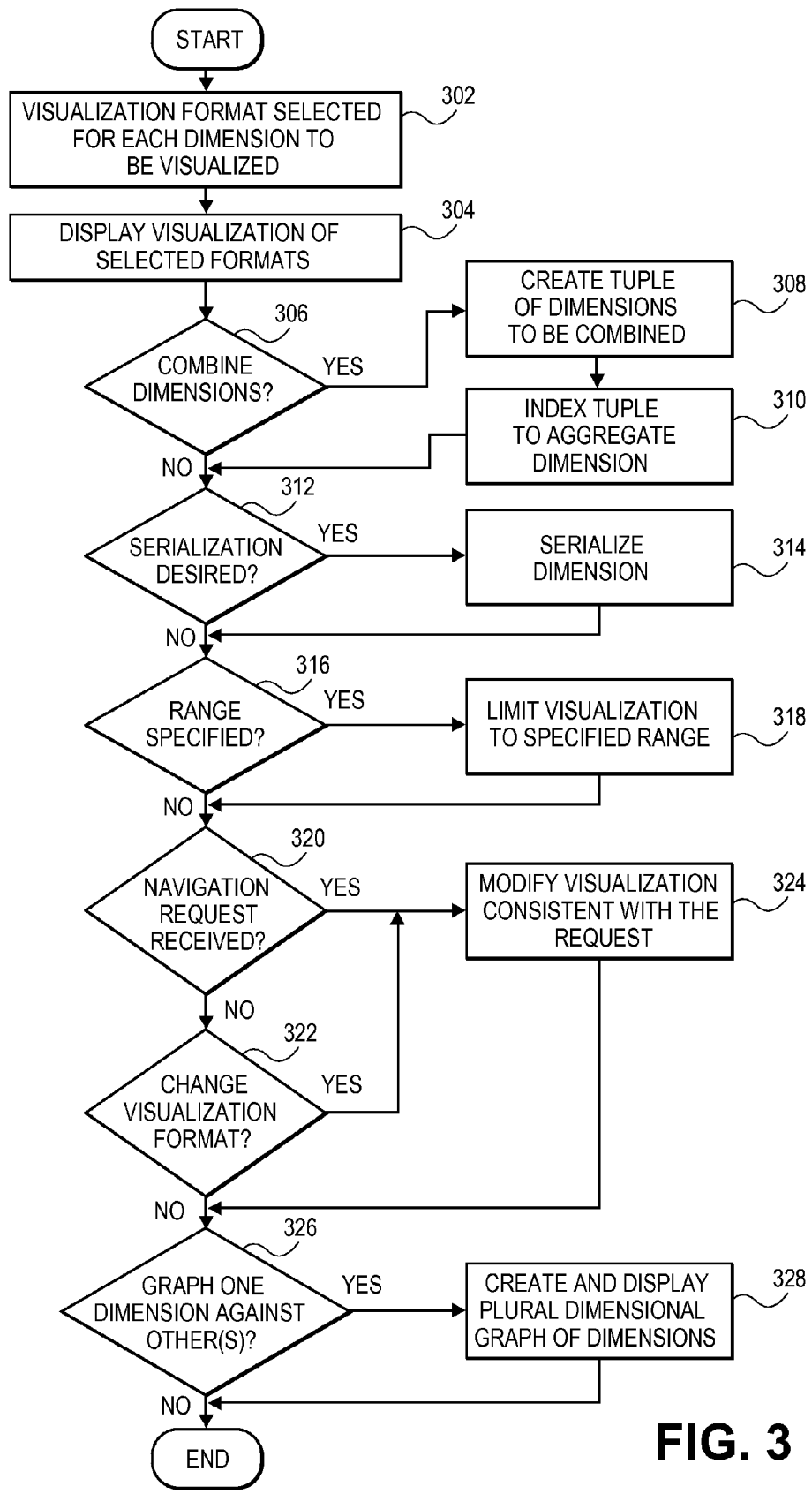
FIG. 3 is a flow diagram of operation of a system according to one embodiment of the invention.

FIG. 3 is a flow diagram of operation of a system according to one embodiment of the invention. At block 302, a desired format for visualization is selected from the available defined formats for visualization. It is envisioned that additional visualization formats may be added beyond, for example, the dimension graph, pivot twin tree and pivot element representations discussed above. Initially, the processor using e.g. the rule engine may select a default visualization format for each dimension. Then, the user is able to modify that selected visualization by selecting a format as described above with reference to FIG. 1. In one embodiment, the rule engine then remembers that selection (to the extent that it otherwise differs from the default) to ensure the visualization is provided to user without having to repeat the selection going forward. At block 304, the selected visualization for each dimension is displayed.

At decision block 306, a determination is made whether the dimensions should be combined. If the user indicates that two or more dimensions should be combined, a tuple of the combined dimensions is created at block 308, corresponding to the cross product of the elements of these dimensions, for example, including the tuple [time_one, serial_number_one]. The set of all tuples is indexed on an axis of the resulting aggregate dimension at block 310. Then a decision is made at decision block 312 whether serialization of the dimension is desired. Serialization may be required where ordering of the elements in the (aggregate) dimension would otherwise be ambiguous, such as after combination or in the case of SOP as described above. In the event that serialization is desired, dimension is serialized at block 314 by (temporarily) inserting predecessor-successor relations between the elements in order to eliminate this ambiguity. In some embodiments, the processor may use a rule engine to instruct serialization. In other embodiments, processor may prompt the user to indicate a desired ordering in the ambiguous case. Once the serialization is complete or if no serialization is desired, the determination is made at block 316 if a range for the visualization is specified. For example, if the range is limited to immediate neighbors, the visualization displayed is limited to that specific range at block 318. Combination, serialization and limitation activities can be executed by the user in any order. For instance, it is reasonable for a user to first serialize each dimension before their combination in order to reduce the serialization effort on the aggregate dimension. Certainly, a reasonable limitation along each dimension which is to be combined will reduce both the combination and serialization effort afterwards. Notably, the visualization displayed to user anywhere along this process can be modified responsive to the further processing.

The determination is made at decision block 320 whether a navigation request has been received. For example, actuation of one of the arrow soft buttons in the pivot element format to change the pivot element to a predecessor or successor. If such request had been received the visualization is modified consistent with the request at block 324. This change in visualization will also propagate to change other dimension windows affected by the change in the navigated window.

At decision block 322, a determination is made if a change in visualization form has been requested. For example, a change from dimension graph to pivot twin tree or pivot element format through selection in the drop-down menu. If such a request has been received, the visualization format displayed is modified consistent with the request. At block 326, a determination is made if a request was received to graph one dimension against another. If such a request has been received, the system creates and displays a plural dimensional graph of the selected dimensions relative to each other at block 328.

Figure 4:
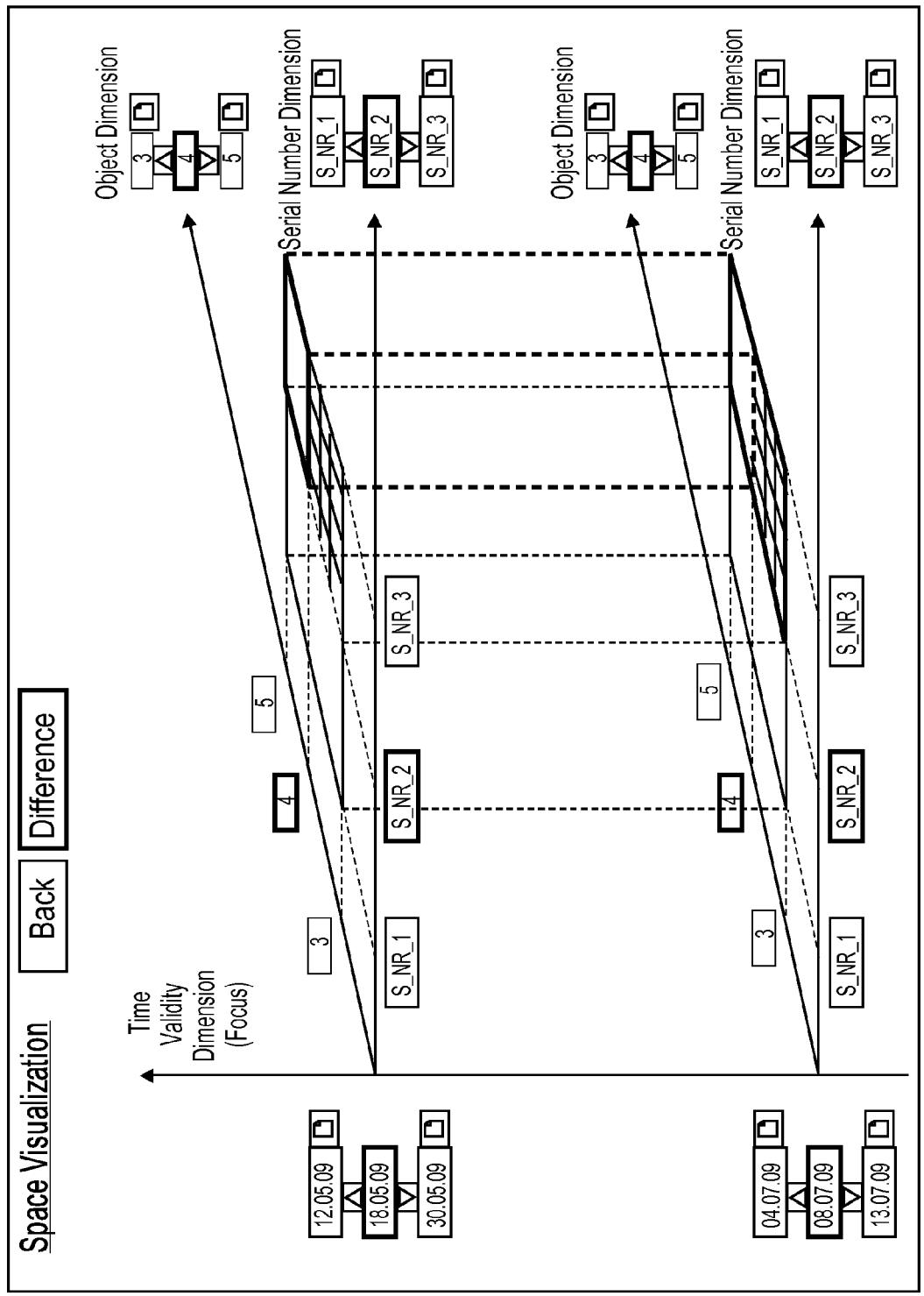
FIG. 4 shows an example of a limited plural dimensional view on the data set.

FIG. 4 shows an example of a plural dimensional graph of one dimension against another. In this example, object dimension with pivot element is graphed against time and serial number. Differences between the states can be graphically represented with shading or color differences. Here, the cross hatched area is reflective of the difference between the two selected pivot times.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A method comprising:
    selecting, in a processor, one of a plurality of visualization formats from a set of defined visualization formats for each dimension of a plural dimension data set;
    displaying, on an electronic display, the selected visualization format for at least one dimension;
    serializing elements of a dimension with ambiguous ordering, the dimension belonging to the plurality of dimensions or being an aggregate dimension; and
    providing an interface to permit navigation between elements of the plural dimension data set within the displayed visualization format.

2. The method of claim 1 further comprising: reducing a number of dimensions for visualization prior to displaying by combining a plurality of dimensions of the data set to form an aggregated dimension.

3. The method of claim 2 wherein combining comprises: creating a tuple of elements belonging to each of the plurality of dimensions to be combined; and indexing the tuple in the aggregate dimension.

4. The method of claim 1 further comprising: identifying a limited view of the data set for visualization.

5. The method of claim 4 wherein identifying a limited view comprises: selecting a pivot element for a dimension; and defining a range about the pivot element of elements of the dimension to display.

6. The method of claim 4 wherein identifying a limited view comprises: selecting a component that is defined for the data set; limiting display to data set elements related to the component.

7. The method of claim 1 wherein providing an interface comprises: introducing an artificial element between a leaf elements and a root element to permit revolving navigation.

8. A non-transitory computer readable medium containing instructions that when executed by a processor cause the processor to:
    retrieve a plurality of visualization formats in a processor;
    accept a selection of one of the plurality of visualization formats for each dimension of a plural dimension data set;
    display on an electronic display the selected visualization format for at least one dimension;
    provide an interface to permit navigation between elements of the plural dimension data set within the displayed visualization format; and
    introduce an artificial element between a leaf elements and a root element to permit revolving navigation.

9. The computer readable medium of claim 8 wherein the instructions causing the processor to display, cause the processor to: create a window on the display for each dimension to be visualized; and present in a corresponding window the visualization format selected for the dimension.

10. The computer readable medium of claim 8 wherein the instructions causing the processor to display, cause the processor to: generate a plural dimensional graph depicting an effect of constraints in one dimension on data in another dimension.

11. The computer readable medium of claim 8 further comprising instructions causing the processor to: constrain a view of a visualization format to a selected range within the data set.

12. The computer readable medium of claim 8 further comprising instructions causing the processor to: combine two or more dimensions prior to selection of a visualization format.

13. The computer readable medium of claim 8 further comprising instructions causing the processor to: serialize a dimension having ambiguous ordering.

14. A system comprising:
    a processor;
    a display;
    a database containing a parameter effective data set to be visualized in plural dimensions;
    a serializer to linearly order data in a dimension having ambiguous inherent ordering;
    a visualization format library defining a set of visualization formats that may be applied by the processor to a dimension of the data set; and
    a graphical user interface to allow selection of a portion of the data set for visualization, selection of a visualization format and navigation within the visualization.

15. The system of claim 14 wherein the serializer comprises: a rule engine to apply a set of previously defined ordering rules; and a user interface to allow a user to define at least one of rules or a specific order.

* * * * *